(12) United States Patent
Hattrup

(10) Patent No.: US 12,336,072 B2
(45) Date of Patent: Jun. 17, 2025

(54) LED DRIVER AND LIGHTING SYSTEM USING THE SAME

(71) Applicant: SIGNIFY HOLDING B.V., Eindhoven (NL)

(72) Inventor: Christian Hattrup, Wurselen (DE)

(73) Assignee: SIGNIFY HOLDING B.V., Eindhoven (NL)

( * ) Notice: Subject to any disclaimer, the term of this patent is extended or adjusted under 35 U.S.C. 154(b) by 151 days.

(21) Appl. No.: 17/770,459

(22) PCT Filed: Oct. 12, 2020

(86) PCT No.: PCT/EP2020/078604
§ 371 (c)(1),
(2) Date: Apr. 20, 2022

(87) PCT Pub. No.: WO2021/078562
PCT Pub. Date: Apr. 29, 2021

(65) Prior Publication Data
US 2022/0386433 A1     Dec. 1, 2022

(30) Foreign Application Priority Data

Oct. 22, 2019  (EP) .................................. 19204633

(51) Int. Cl.
*H05B 45/54*   (2020.01)
*H05B 45/345*  (2020.01)
*H05B 45/37*   (2020.01)
*H05B 45/50*   (2022.01)

(52) U.S. Cl.
CPC ........... *H05B 45/54* (2020.01); *H05B 45/345* (2020.01); *H05B 45/37* (2020.01); *H05B 45/50* (2020.01)

(58) Field of Classification Search
CPC ........ H05B 45/54; H05B 45/50; H05B 45/37; H05B 45/345
See application file for complete search history.

(56) References Cited

U.S. PATENT DOCUMENTS

| | | | |
|---|---|---|---|
| 6,704,183 B2 | 3/2004 | Stafford | |
| 8,692,477 B1 | 4/2014 | Lee | |
| 10,033,285 B1 | 7/2018 | Zhang et al. | |
| 2006/0170287 A1* | 8/2006 | Ito ........................ | H05B 45/382 307/10.1 |
| 2010/0320989 A1 | 12/2010 | Chang et al. | |
| 2012/0182328 A1* | 7/2012 | Yoon ....................... | G09G 5/10 345/690 |
| 2016/0268908 A1 | 9/2016 | Chang et al. | |

(Continued)

FOREIGN PATENT DOCUMENTS

| | | | | |
|---|---|---|---|---|
| CN | 201947164 U | 8/2011 | | |
| DE | 19651463 C1 * | 4/1998 | ............. | H04M 9/02 |
| EP | 1976338 A1 | 10/2008 | | |

(Continued)

*Primary Examiner* — Lincoln D Donovan
*Assistant Examiner* — James G Yeaman

(57) ABSTRACT

A LED driver having a current sensing resistor arrangement with two parallel current sensing branches, each comprising at least two series resistors connected at a respective sensing node, is provided. The voltages at the two sensing nodes are processed to detect a component failure. The normal current control is based on the voltage across the overall resistor arrangement.

12 Claims, 3 Drawing Sheets

(56) References Cited

U.S. PATENT DOCUMENTS

| | | |
|---|---|---|
| 2019/0140547 A1 | 5/2019 | Chang et al. |
| 2019/0208589 A1* | 7/2019 | Satterfield .............. H05B 45/35 |

FOREIGN PATENT DOCUMENTS

| | | | |
|---|---|---|---|
| JP | S61169837 U | | 10/1986 |
| JP | H04334898 A | | 11/1992 |
| JP | 2001066139 A | * | 3/2001 |
| JP | 2008029132 A | | 2/2008 |
| JP | 2011050126 A | | 3/2011 |
| JP | 2011129655 A | | 6/2011 |
| JP | 2014067666 A | | 4/2014 |
| JP | 2018097973 A | | 6/2018 |
| WO | 2013120893 A1 | | 8/2013 |

\* cited by examiner

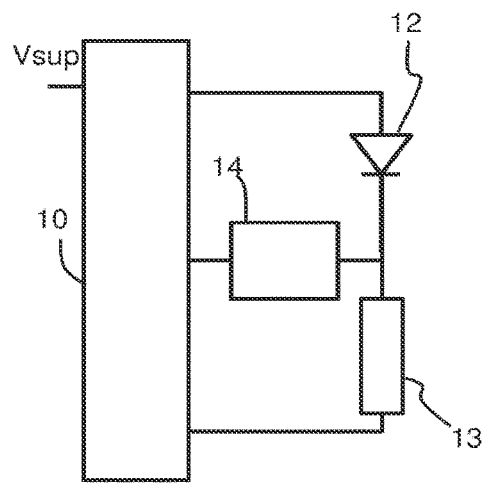
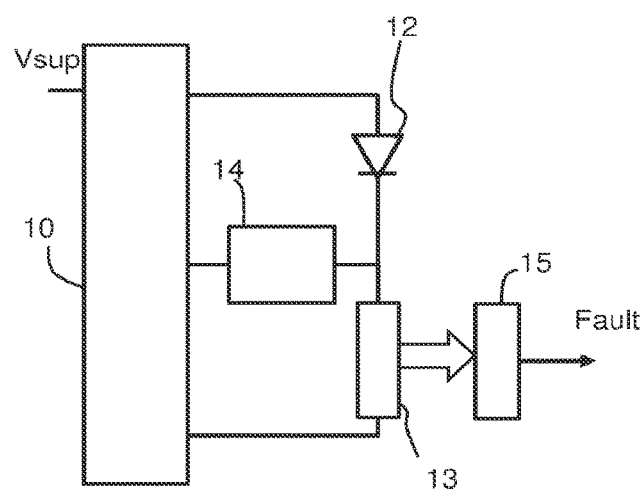
FIG. 1A
Prior Art
FIG. 1B
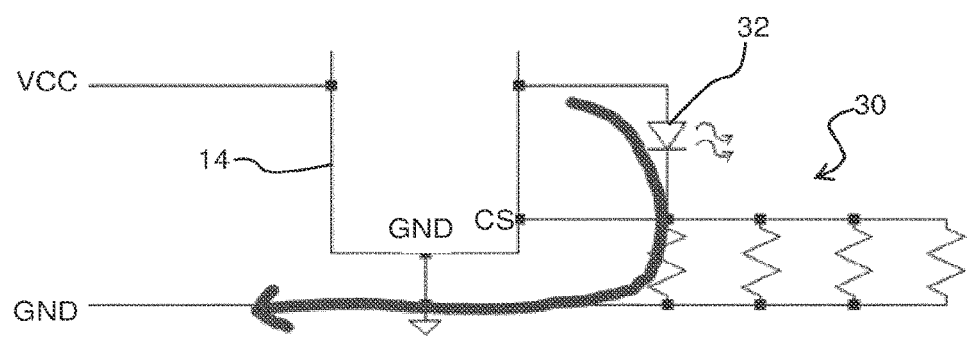
FIG. 2

LED DRIVER AND LIGHTING SYSTEM USING THE SAME

CROSS-REFERNCE TO PRIOR APPLICATIONS

This application is the U.S. National Phase application under 35 U.S.C. § 371 of International Application No. PCT/EP2020/078604, filed on Oct. 12, 2020, which claims the benefit of European Patent Application No. 19204633.2, filed on Oct. 22, 2019. These applications are hereby incorporated by reference herein.

FIELD OF THE INVENTION

This invention relates to LED drivers.

BACKGROUND OF THE INVENTION

Controllable LED drivers may be used to vary the voltage and/or current supply provided to a load in the form of a LED arrangement. Control of such LED drivers is for example based on a feedback loop, which feeds back the current or voltage at the LED arrangement. This invention relates in particular to LED drivers which make use of a current feedback signal representing the current flowing through the LED arrangement.

FIG. 1A shows in schematic form a LED driver, comprising a power converter 10 which receives a power supply Vsup and delivers power to the load, in the form of a LED arrangement 12. The LED arrangement is shown as a single diode for simplicity.

The current flowing through the LED arrangement 12 is sensed by a current sense circuit 13. A voltage is generated which represents the current flowing, and this voltage is provided to a controller 14 as a feedback signal. The controller 14 controls the power converter 10 to deliver a target current to the LED arrangement 12. The power converter 10 and the controller 14 may together be considered to be a "driver unit".

The controller 14 can be realized as control IC, a control circuit made of discrete components or a digital microprocessor, or a combination of these.

Typically, for cost and simplicity reasons, the current sense circuit 13 is a resistor that is connected in series with the LED string, preferably between the LED string and a reference potential GND. Often, multiple small resistors are connected in series or parallel to spread the sensing losses and to enable the use of cheap components. The layout is sometimes easier with multiple small components compared to one large component.

In different markets, the LED drivers must comply to different rules, such as the Underwriters Laboratories (UL) rules in the US. These include a single fault safety requirement, meaning that the driver has still to be safe in the event that a single component fails (open circuit or short circuit).

A short circuited current sense resistor causes the LED driver to be out of control because the sense voltage representing the magnitude of the current is no longer proportional to the current, but is always zero. As a consequence, without further protection, the LED driver will deliver a very high current. This current can easily be above defined limit values.

It is known to detect a faulty sense resistor by adding a further resistor between the reference potential GND and the negative power supply rail. This gives two low-side current sense circuits, connected to the positive and the negative side of the GND potential. In this way, the current through the LEDs of the LED arrangement is sensed twice. This allows the detection of a short of one current sense resistor by comparing the two signals.

The disadvantage of this approach is that the LED current flows through both sense resistor combinations and thus the losses are doubled, assuming the two sense resistor combinations have identical values. One of the sense signals is negative with respect to GND, and thus requires extra effort to process the signal.

There is therefore a need for an improved current sense arrangement which detects individual component failure.

SUMMARY OF THE INVENTION

The invention is defined by the claims.

According to examples in accordance with an aspect of the invention, there is provided a LED driver, comprising:
a driver unit for delivering a current to a LED arrangement; and
a resistor arrangement for sensing the current delivered and providing a feedback signal to the driver unit, wherein the feedback signal comprises a voltage across the resistor arrangement,
wherein the resistor arrangement comprises:
a first current sensing branch comprising at least two series resistors connected at a first sensing node; and
a second current sensing branch, in parallel with the first current sensing branch, comprising at least two series resistors connected at a second sensing node,
wherein the LED driver further comprises a fault detection unit for processing the voltages at the first and second sensing nodes to determine a component failure.

This LED driver makes use of a resistor arrangement (functioning as a current sense circuit) with two current sensing branches, in parallel. Each branch has an output node (sensing node) at which a voltage is delivered representing the current flowing. By monitoring both branches, a current sense resistor failure (open circuit or closed circuit) can be detected, by comparing the two voltages. The voltage difference between the two sensing node voltages will only be large (i.e. above a threshold) in the event of a component failure. In normal operation, the voltage difference is small (depending on component tolerances there are always small deviations). The total resistance of the two branches in parallel may be the same as that of a single resistor (if they all have the same value) so that losses are not increased compared to a solution with a single sense resistor.

The voltage across the complete resistor arrangement (i.e. the combination of the two branches) is used as the current sense feedback signal, for current regulation when there is no component failure.

The fault detection unit for example comprises an operational amplifier circuit. This a low cost and low power consumption solution.

The operational amplifier circuit for example comprises a comparator circuit. Thus, the difference in the sensing node voltages is processed, in order to enable indication of a failure.

The operational amplifier circuit for example comprises an amplifier with the inverting and non-inverting inputs respectively connected to the first and second sensing nodes through input resistors.

The operational amplifier circuit for example comprises a negative feedback resistor (to the inverting input) and a biasing arrangement connected to the non-inverting input for providing a positive voltage bias. The negative feedback resistor (in combination with the inverting input resistor)

provides a suitable gain for amplification of the difference, to generate a failure detection signal.

The fault detection unit for example further comprises a window comparator to which the output of the operational amplifier circuit is provided. Thus, component failure can be detected simply by determining if the operational amplifier circuit output signal falls within or outside a signal range. The window comparator may be implemented as a transistor circuit.

A processor may instead be provided to which the output of the operational amplifier circuit is provided. The processor and operational amplifier circuit may for example integrated into a controller IC.

The LED driver is preferably adapted to enter a safe mode when a component failure is detected. This for example involves ceasing the supply of current to the LED arrangement.

The invention also provides a lighting circuit comprising:
a LED driver as defined above; and
a LED arrangement (e.g. a string of LEDs) connected to the output of the LED driver.

The invention also provides a method of controlling an LED driver, comprising:
delivering a current to a LED arrangement;
sensing the current delivered using a resistor arrangement and providing a feedback signal comprising a voltage across the resistor arrangement;
processing voltages at first and second sensing nodes of the resistor arrangement to determine a component failure, wherein the first sensing node is the connection between at least two series resistors of a first current sensing branch and the second sensing node is the connection between at least two series resistors of a parallel second current sensing branch; and
setting the LED driver to a safe mode when a component failure is detected.

The safe mode involves the LED driver ceasing to deliver current to the LED arrangement to prevent further damage of the driver and for example to exclude the risk of fire. If the LED driver is part of a connected system, the fault condition may also be reported to a higher level control system.

These and other aspects of the invention will be apparent from and elucidated with reference to the embodiment(s) described hereinafter.

BRIEF DESCRIPTION OF THE DRAWINGS

Examples of the invention will now be described in detail with reference to the accompanying drawings, in which:

FIG. 1A shows an exemplary prior art topology of a known LED driver;

FIG. 1B shows an example of a LED driver in accordance with the invention;

FIG. 2 shows the basic configuration for a current sense resistor;

DETAILED DESCRIPTION OF THE EMBODIMENTS

Figure 3:
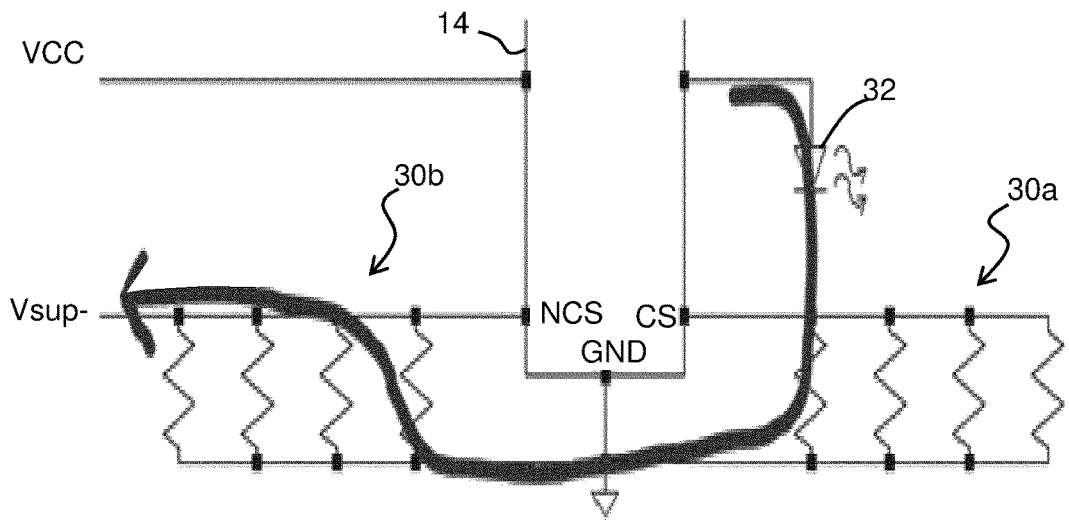
FIG. 3 shows that it is known to detect a faulty sense resistor by adding a second resistor between a reference potential and a negative supply rail.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a LED driver having a current sensing resistor arrangement with two parallel current sensing branches, each comprising at least two series resistors connected at a respective sensing node. The voltages at the two sensing nodes are processed to detect a component failure. The normal current control is based on the voltage across the overall resistor arrangement.

FIG. 1B shows an example of a LED driver in accordance with the invention. The current sense circuit 13 provides signals to a fault detection unit 15, which then enables a fault detection signal "Fault" to be generated. This signal indicates a fault in a resistor of the current sense circuit.

FIG. 2 shows the basic known configuration for a current sense resistor. In this example, the current sensor resistor comprises a bank 30 of four resistors in parallel, with the bank in series with the LED arrangement 32. The voltage across the bank of resistors is provided to a current sense ("CS") input of the controller 14, and the resistor bank is connected between the current sense input CS and ground, GND. VCC is the low voltage supply to the controller 14, such as 5V or 3.3V, and GND is ground, although any reference potential may be used.

The use of a bank of resistors spreads the sensing losses and enables the use of low cost components. As mentioned above, the controller 14 can be realized as control IC, a control circuit made of discrete components or a digital microprocessor, or a combination of these.

As shown in FIG. 3, it is known to detect a faulty sense resistor (within the resistor bank 30a) by adding a second resistor (in this example a second resistor bank 30b) between the reference potential GND and a negative power supply Vsup-. There are then two low-side current sensing circuits 30a, 30b, connected to the positive and the negative side of the GND potential. In this arrangement, the current through the LEDs of the LED arrangement is sensed twice. The first current sense signal is provided to a positive current sense input CS, and the second current sense signal is provided to a negative current sense input NCS. This allows detection of a short of one current sense resistor by comparing the two signals.

Disadvantages of this approach are firstly that the LED current flows through both sense resistor combinations (as shown) and hence the losses are doubled (assuming identical resistor values). Secondly, the NCS signal is negative with respect to ground (or other reference used), and this requires extra effort to process the signal.

Figure 4:
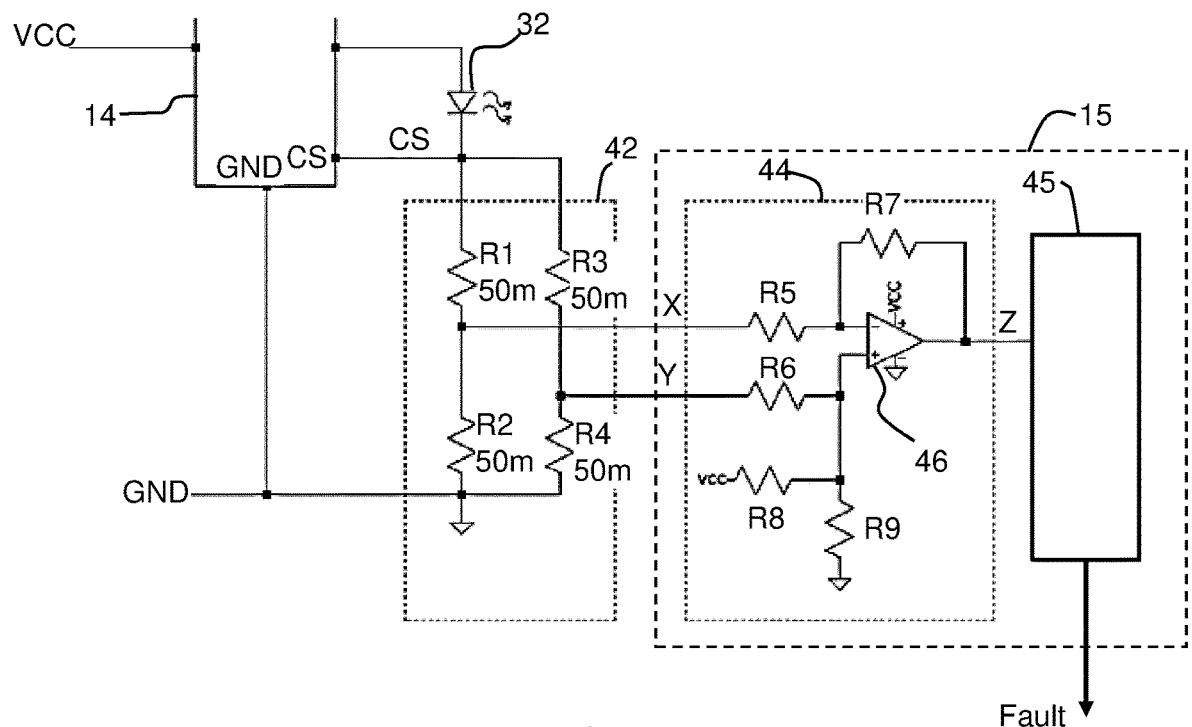
FIG. 4 shows an example of a current sense circuit in accordance with the invention.

FIG. 4 shows an example of a current sense circuit 42 and fault detection unit 15 in accordance with the invention. The fault detection unit 15 comprises an amplifier circuit 44 and a comparator unit 45.

As explained above, the current sense circuit is for use within a LED driver, wherein a power converter delivers a current to a LED arrangement 32. The LED arrangement can be any (series and parallel) combination of multiple LEDs. A single LED is shown only for simplification. The controller 14 is for controlling the power converter 10, and the controller 14 and power converter may be considered to be a driver unit. A resistor arrangement 42 senses the current delivered and provides a feedback signal CS to the driver unit, in particular to the controller 14. This feedback signal CS is based on the voltage across the full resistor arrangement.

A first current sensing branch of the resistor arrangement comprises two series resistors R1, R2 connected at a first sensing node X. A second current sensing branch is in parallel with the first current sensing branch, and comprises two series resistors R3, R4 connected at a second sensing node Y. The two branches together form the resistor arrangement 42. The fault detection unit 15 processes the voltages at the first and second sensing nodes X, Y to detect a component failure.

The current sense circuit 42 in the arrangement of FIG. 4 thus makes use of four resistors, two in series and two of these series connections in parallel. With this arrangement, the total resistance is equal to the value of a single resistor, such as 50 mΩ Thus, the same current sense feedback signal CS is generated as for a single current sense resistor, and with the same losses.

There may be more than four resistors, however, in that each branch may have more than two series resistors, or there may be parallel sub-branches within each branch.

As explained above, the sense voltage used for current control in the LED driver is the voltage across the complete current sense circuit, namely the voltage to the current sense node CS.

The amplifier unit 44 of the fault detection unit 15 amplifies the voltage difference between the sensing nodes X and Y to detect if one of the resistor values largely deviates from its desired value (in the extreme case with an open circuit or short circuit). There will also be a small difference voltage resulting from component tolerances of the sense resistors, but this difference is small compared to the difference resulting from a fault condition.

If all resistors R1 to R4 are similar in value (and much smaller in value than the resistors used in the amplifier unit 44), the voltage difference between sensing nodes X and Y is very small. In particular, the amplifier unit 44 draws almost no current (relative to the LED current passing through resistors R1 to R4) and hence has negligible effect on the voltages at the sensing nodes X and Y.

If one of the resistors fails with an open circuit or short circuit, the voltage difference between the sensing nodes X and Y becomes large. This is used to detect component failure and the LED driver can be switched off to enter a safe operating mode without exceeding current and/or voltage limits or the risk of fire.

In FIG. 4, the sensing nodes X and Y are connected to an amplifier unit 44 in the form of a simple operational amplifier circuit. This is advantageous because the overall current sense voltages (measured at CS) are small (e.g. 100 mV) and the maximum voltage difference in the case of a single failed component (either open circuit or short circuit) is even smaller (such as half of the sense voltage, hence around 50 mV max).

The operational amplifier circuit shown in FIG. 4 comprises an operational amplifier 46 with inverting and non-inverting inputs respectively connected to the first and second sensing nodes X, Y through input resistors R5, R6. A negative feedback resistor R7 sets the gain of the operational amplifier circuit. In particular, the operational amplifier circuit has a gain for example in the range 20 to 100. The gain that is appropriate depends on the design of the sense resistors and the current flowing through the LEDs (and the sense resistors). Tolerances of the sense resistors also play a role. For example, assuming a 2 A LED current and 2% tolerated 50 mΩ sense resistors, X might be at 49 mV and Y might be at 51 mV (this is the worst case difference). Amplifying this 2 mV difference by a gain of 100 will result in a 200 mV change at the point Z. A fault condition will lead to 50 mV amplified by 100 which is 5V. Thus, a fault condition can easily be distinguished from tolerance variations in the circuit.

A biasing arrangement R8, R9 is connected to the non-inverting input of the operational amplifier 46 for providing a positive voltage bias. The biasing arrangement comprises a resistive divider between the controller (low voltage) supply VCC and ground GND. It lifts the output voltage by e.g., VCC/2 to avoid the need for dual supply solutions (with the consequent extra cost and components).

The amplified output Z may then be provided to a window comparator, forming the comparator unit 45 of the fault detection unit 15. As soon as the amplified voltage leaves a predefined allowed voltage window around VCC/2 (the offset voltage), comparators in the window comparator trigger the LED driver to enter the safe condition.

In an alternative arrangement, the amplifier output Z may be compared to the low voltage supply rails (VCC and GND) to trigger the LED driver to enter a safe condition.

Figure 5:
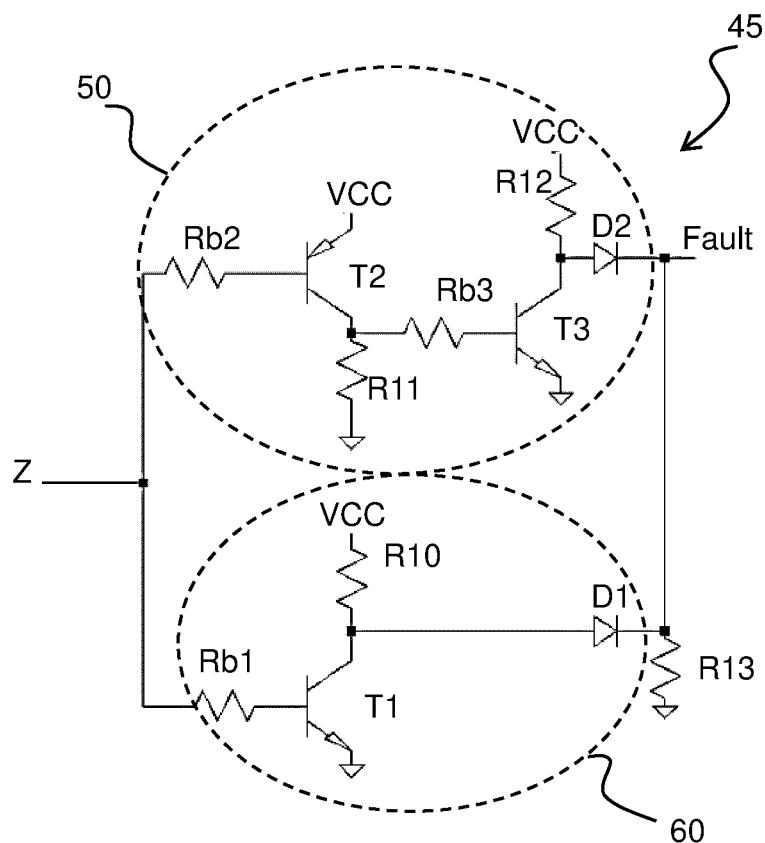
FIG. 5 shows an example of a comparator unit for processing the output of the current sense circuit.

FIG. 5 shows an example of the comparator unit 45 based on a transistor circuit for implementing a window comparator.

The output Z from the amplifier unit 44 of the fault detection unit 15 is provided to transistor circuit, which acts as a simple window comparator.

A first circuit portion 50 is used to generate a high output "Fault" when the signal Z rises above the upper window limit and a second circuit portion 60 is used to generate a high output "Fault" when the signal Z falls below the lower window limit. When signal Z is within the window, the output "Fault" is pulled low by a pull down resistor R13.

There are two fault conditions depending on which of the sense resistors fails and if it fails with a short or with an open circuit. In one fault condition, the difference voltage between X and Y is large and positive or the difference voltage between X and Y is large and negative. The first case results in a large negative voltage at Z (the inverting operational amplifier 46 will for example be saturated and its output is almost GND), the second case results in a large positive voltage at Z (the inverting operational amplifier 46 will for example be saturated and its output is almost VCC).

If the voltage at Z is close to VCC (larger than the base emitter voltage of T2) T2 stops conducting and there is no base current to transistor T3 through Rb3 anymore. The combination of R12 and D2 pulls the output "Fault" high, indicating a fault condition. T1 remains conductive in this case and there is no current flow through D1.

Similarly, if the voltage at Z is close to the GND level (lower than the base emitter voltage of T1) T1 stops conducting and current can flow through R10 and D1 pulling the output "Fault" high. T2 and T3 remain conductive in this case and there is no current flow trough D2.

In normal operation the voltage difference between X and Y is small and thus also the output Z of the amplifier unit 44 of the fault detection unit 15 equals the offset (VCC/2) plus a small amplified difference voltage. Then both transistors T2 and T1 remain conductive and the fault output is held low by the pull down resistor R13 at the output.

This circuit can thus be implemented using low cost transistors, forming a transistor window comparator circuit.

The gain of the amplifier unit 44 may be selected to trigger the pull-up and pull-down transistor circuits at the appropriate voltage differences between the sensing nodes X and Y.

In another example, the output Z may be connected to an analogue input of a microprocessor. The microprocessor then decides in software to put the driver in a safe operating mode, based on the actual amplified differential voltage value.

In another example, the fault detection unit 15 (i.e. the amplifier unit 44 and the comparator unit 45) is embedded in an IC controller of the LED driver. This greatly reduces cost, component count and board space and increases robustness. Only two extra pins are needed to connect to the X and Y sensing node signals. The current sense resistors may also be located inside the IC controller.

The invention may be applied to any driver architecture which employs current sensing in order to provide feedback control. The driver may make use of a switch mode power converter. For example, the driver then has a switching stage (such as a two-transistor inverter stage) and the switching duty cycle and/or frequency is controlled in dependence on the feedback signal. The power converter may be a buck converter or a boost converter or a flyback converter. The invention may be applied to resonant converters or non-resonant converters. The invention may be applied to isolated or non-isolated drivers. Furthermore, the invention may be applied to linear drivers which do not employ high frequency switching.

Thus, the invention is applicable to all kinds of drivers using a resistive current sense circuit.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A LED driver, comprising:
   a driver unit configured to deliver a current to a LED arrangement; and
   a resistor arrangement configured to sense the current delivered and provide a feedback signal to the driver unit, wherein the resistor arrangement is arranged in series with the LED arrangement,
   wherein the feedback signal comprises a voltage across the resistor arrangement, wherein the resistor arrangement comprises:
   a first current sensing branch comprising at least two series resistors connected at a first sensing node; and
   a second current sensing branch, in parallel with the first current sensing branch, comprising at least two series resistors connected at a second sensing node, wherein the first sensing node is a connection between the at least two series resistors of the first current sensing branch and the second sensing node is the connection between the at least two series resistors of the second current sensing branch,
   wherein the LED driver further comprises a fault detection unit coupled to the first sensing node and the second sensing node and configured to receive the voltages at the first sensing node and the second sensing node to determine a difference of the voltages at the first and second sensing nodes to determine a component failure.

2. The LED driver as claimed in claim 1, wherein the fault detection unit comprises an operational amplifier circuit.

3. The LED driver as claimed in claim 2, wherein the operational amplifier circuit comprises an amplifier with inverting and non-inverting inputs respectively connected to the first and second sensing nodes through input resistors.

4. The LED driver as claimed in claim 3, wherein the operational amplifier circuit comprises a negative feedback resistor and a biasing arrangement connected to the non-inverting input for providing a positive voltage bias.

5. The LED driver as claimed in claim 4, wherein the biasing arrangement is coupled to a voltage supply.

6. The LED driver as claimed in claim 3, wherein the fault detection unit further comprises a window comparator to which the output of the operational amplifier circuit is provided.

7. The LED driver as claimed in claim 6, wherein the window comparator comprises a transistor circuit.

8. The LED driver as claimed in claim 3, wherein the fault detection unit further comprises a processor to which the output of the operational amplifier circuit is provided.

9. The LED driver as claimed in claim 8, wherein the processor and operational amplifier circuit are integrated into a controller IC.

10. The LED driver as claimed in claim 1, wherein the LED driver is adapted to enter a safe mode when a component failure is detected.

11. A lighting circuit comprising:
    a LED driver as claimed in claim 1; and
    a LED arrangement connected to the output of the LED driver.

12. A method of controlling an LED driver, comprising:
    delivering a current to a LED arrangement;
    sensing the current delivered by using a resistor arrangement and providing a feedback signal comprising a voltage across the resistor arrangement, wherein the resistor arrangement is arranged in series with the LED arrangement;
    determine a difference of voltages at first and second sensing nodes of the resistor arrangement to determine a component failure, wherein the first sensing node is the connection between at least two series resistors of a first current sensing branch and the second sensing node is the connection between at least two series resistors of a parallel second current sensing branch, wherein the second sensing branch is coupled in parallel to the first current sensing branch, wherein the difference of the voltages at the first and second sensing nodes is determined by a fault detection unit coupled to the first sensing node and the second sensing node and configured receive the voltages at the first sensing node and the second sensing node; and
    setting the driver to a safe mode when a component failure is detected.

* * * * *